Patented Jan. 24, 1950

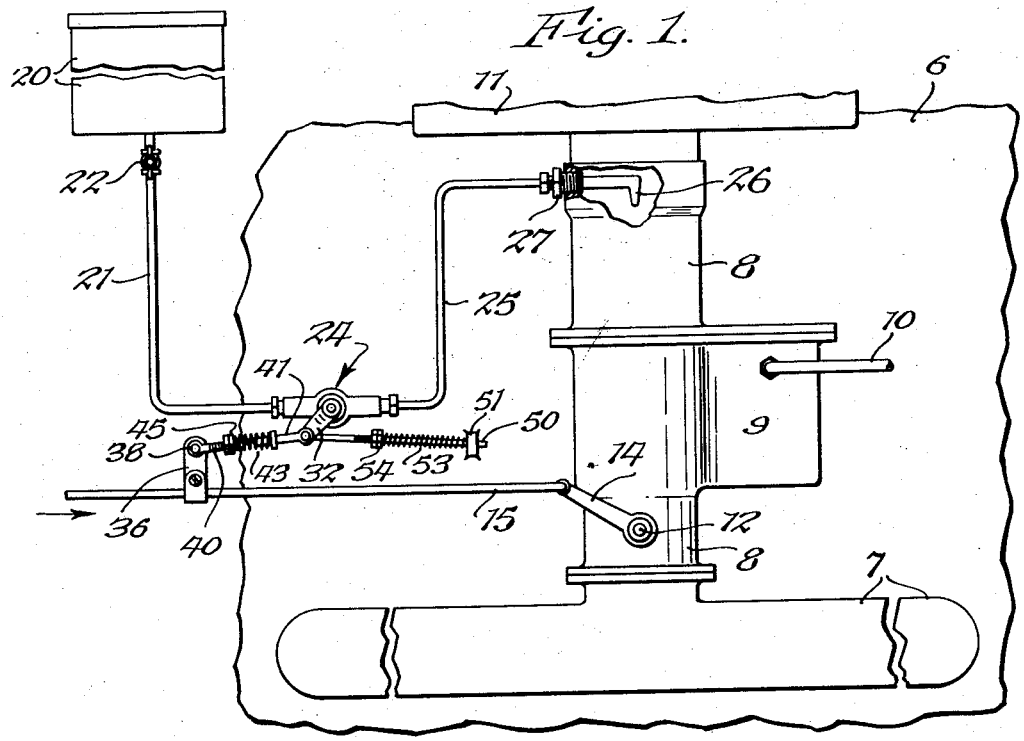
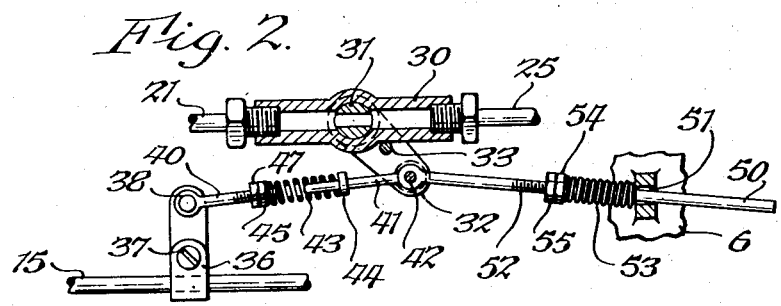
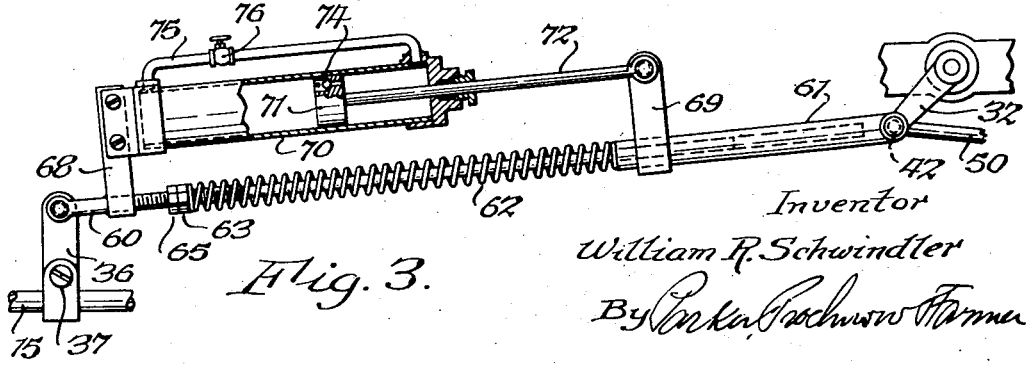
Fig. 1.
Fig. 2.
Fig. 3.
Inventor
William R. Schwindler
Attorneys.

2,495,485

UNITED STATES PATENT OFFICE 2,495,485

MEANS FOR SUPPLYING WATER TO INTERNAL-COMBUSTION ENGINES

William R. Schwindler, Needham, Mass.

Application July 31, 1946, Serial No. 687,411

2 Claims. (Cl. 123—25)

This invention relates to improvements in means for supplying water to the cylinders of an internal combustion engine.

It is well known that the introduction of a limited quantity of water, either in the form of a liquid or a vapor, into the intake of an internal combustion engine, produces an improved action of the engine under many conditions. To obtain the best results, such water, however, should be admitted in regulated quantities, such quantities depending to a certain extent upon the speed of the engine and the power delivered by the engine.

One of the objects of this invention is to provide means for supplying water to an engine in such quantities as to assure the best operation of the engine. It is also an object of this invention to provide means for admitting water, which are actuated by the throttle valve of the engine in such a manner that at low speeds either no water or very little water is supplied to the engine, and so that the water supply is increased as the throttle opening is increased until the maximum flow of water is provided, after which further opening of the throttle valve will not materially increase the water admitted to the engine. It is also an object of this invention to provide a simple and inexpensive mechanism including two opposed springs which produce a modified action of the water valve as compared with the throttle valve of the engine. It is a further object of this invention to provide water valve opening means controlled by the throttle valve, and in which the action of the water valve is modified by means of a dashpot. Other objects and advantages of this invention will appear from the following description and claims.

In the accompanying drawings:

Fig. 1 is a fragmentary side elevation of an internal combustion engine having water supply means embodying this invention applied thereto.

Fig. 2 is a fragmentary view of the water supply means showing the water supply valve in section and showing the parts in different positions than in Fig. 1.

Fig. 3 is a fragmentary view showing means of modified construction for controlling the water supply.

In the particular embodiment of the invention illustrated in the drawings, 6 represents a part of an internal combustion engine to which air or a combustible mixture is supplied through an intake manifold 7 in any usual or suitable manner. Air is supplied to the intake manifold 7 by means of an air passage or duct 8. In the case of an Ott cycle or gasoline engine, this air passage includes a carburetor 9 to which fuel is supplied in any suitable manner by means of a fuel pipe 10. 11 represents the usual air filter arranged at the air receiving end of the engine. The operation of the engine is controlled by means of the usual throttle valve (not shown) mounted on a shaft or rod 12 to which a crank arm or lever 14 is secured. 15 represents a rod connected to the arm or lever 14 of the throttle valve and operatively connected to an accelerator or other throttle control device. All of these parts of themselves do not constitute a part of this invention, and are commonly used on gasoline engines. While a gasoline engine is shown for the purpose of illustrating the application of this invention, it will be understood that this invention may equally well be used with engines operating on other fuels, such for example as Diesel engines, in which case, of course, no carburetor would be used in the air passage and suitable fuel injection means would be provided.

Water may be supplied to the engine from any suitable source, and in the construction illustrated a tank or container 20 is provided, which is connected by means of a tube 21 including a shut-off valve 22, to a water control valve 24, and water is discharged from the control valve to a tube or duct 25 to a discharge nozzle 26 of any suitable construction arranged within the air passage 8. The nozzle may be attached to the air passage 8 in any suitable manner and connected with the tube 25. In the construction shown, a threaded plug 27 carrying the nozzle 26 is secured in a threaded hole in the air duct 8 and the tube 25 may be coupled to the plug 27 in any suitable or usual manner. The nozzle is preferably arranged so that the water will be discharged substantially in the axial portion of the air passage 8.

The valve used for controlling the supplying of water may be of any suitable or desired construction and as illustrated, the valve has a housing 30 having a passage therein for the water and a plug 31, the plug having an aperture therein which, on turning of the plug, is moved into and out of alinement with the passage in the housing. This valve plug is rigidly connected with an arm 32. When the arm of the valve is in the position shown in Fig. 1, the valve is closed and when the arm is in the position shown in Fig. 2, the valve is open. A suitable stop 33 may be provided for limiting the opening movement of the valve 31. A valve of other suitable construction may be employed, if desired.

In order to actuate the valve arm 32 from the rod 15 connected with the throttle valve, the following construction is preferably employed. The rod 15 is provided with suitable bracket or clip 36 which is rigidly clamped or secured to the rod 15, for example, by means of a clamping screw 37. The bracket or clip has a pivot 38 arranged thereon which is yieldingly connected with the valve lever or arm 32 in any suitable manner so that movement of the rod 15 transmits motion to the lever 32 of the valve through a resilient medium, and preferably this resilient medium is adjustable to vary the amount of movement transmitted to the lever 32. In the construction shown for this purpose, a rod 40 is pivoted through the medium of the pivot 38 to the bracket or clip 36 and another rod 41 is pivotally mounted on the lever 32 through the medium of a pivot 42. The adjacent ends of these two rods are connected by means of a coil spring 43 which extends over the adjacent ends of the rods, and thus hold the rods substantially in alinement. A collar 44 on the rod 41 is engaged by one end of the spring 43 and a nut 45 on the threaded part of the rod 40 is engaged by the other end of the spring 43. The nut 45 is preferably adjustable on a screw-threaded part of the rod 40 and may be held in fixed position by means of a lock nut 47. Any other means for providing a resilient connection between the throttle valve rod 15 and the lever 32 of the water valve may be employed.

The two rods 40 and 41 and the interposed spring 43 can, of course, only exert pressure against the arm 32 in a direction to open the valve 31. In order to effect movement of the valve in a direction to close the same, another rod 50 is provided, which extends through an eye or apertured part 51 secured in fixed relation to the valve, for example, the eye or apertured part 51 may be secured to a stationary part of the engine. The hole is of ample size to permit the rod 50 to slide freely through the same while in different angular relations thereto. This rod preferably also has a threaded portion 52, and a compression spring 53 extends about the rod and bears at one end against the eye or apertured lug 51 and at its other end against a nut 54 on the threaded part of the rod. A lock nut 55 serves to hold the spring engaging nut 54 in the desired position on the rod 50. The spring 53 urges the lever 32 into a valve closing position, against the action of the spring 43.

In the operation of the device, when the throttle rod 15 is in a position in which the engine is idling, as clearly shown in Fig. 1, the rod 15 is at the left in Fig. 1 and the bracket or clip 36 is in its extreme position to the left in Fig. 1. The spring 53, consequently, moves the lever 32 into a position in which the water valve will be either closed entirely or nearly closed. When the throttle valve is in a more open position resulting from the movement of the rod 15 to the right in Figs. 1 and 2, the parts may occupy the positions shown in Fig. 2, in which the lever 32 of the water valve has been moved to the limit of its movement toward the right. In this position, the water valve will be wide open to admit the maximum amount of water to the engine. However, the arm 32 of the engine reaches this position sometime before the throttle is in wide open position, and consequently, when the parts are in the position shown in Fig. 2, it is still possible to move the throttle rod 15 farther to the right in Fig. 2, resulting in further compressing of the spring 43, but in no further movement of the water valve control lever 32. For example, if desired, the parts of the water feed mechanism may be adjusted so that the engine receives the maximum amount of water when operating an automobile at a speed of about 40 or 45 miles an hour. Beyond that speed, no increased quantity of water will be supplied to the engine. By adjusting the nuts 45 and 54 and by adjusting the bracket or clip 36 lengthwise of the throttle valve rod 15, the opening and closing of the water valve 31 may be operated in different relations to the movement of the throttle valve rod.

It is, for example, possible to adjust the nut 54 so that the spring 53 is under compression when the parts are in the position shown in Fig. 1, whereupon some movement of the rod 15 in a direction to open the throttle valve is necessary to first compress the spring 43 before any opening of the water valve results. Consequently, no water will be admitted to the air passage when the engine is operating at slow speeds. If it is desired to supply water to the engine at low speeds, this can be accomplished by adjusting the nuts 45 and 54 so that in the positions shown in Fig. 1, the spring 43 will be under greater compression than the spring 53.

In the construction shown in Fig. 3, the lever 32 of the water valve is connected with the bracket or clip 36 of the throttle valve rod by means of slightly different construction. In this case, a rod 60 is pivotally mounted on the bracket or clip 36 and this rod telescopes into a hollow or tubular member 61 pivoted to the arm 32 of the water valve. The two rods are, consequently, held accurately in alinement. A compression spring 62 is interposed between the tubular member 61 and the rod 60. For example, one end of the spring may abut against the end of the tubular member and the other end against a nut 63 arranged on a threaded portion of the rod 60 and locked in the desired position by means of a lock nut 65. The operation of this part of the mechanism shown in Fig. 3 is similar to the corresponding mechanism disclosed in Figs. 1 and 2.

The action of the spring 62 in the mechanism shown in Fig. 3 is supplemented by a dashpot or check valve. In the particular construction shown for this purpose, two brackets or clips 68 and 69 are provided, the bracket 68 being secured to the rod 60 and the bracket 69 to the tubular member 61. A cylinder 70 is secured to one of these brackets, for example, the bracket 68, and a piston 71 within the cylinder is secured by means of a piston rod 72 to the bracket 69. The piston has a check valve 74 controlling an orifice extending through the piston. The opposite ends of the cylinder are connected by means of a bypass tube or passage 75 which may, if desired, be controlled by means of a valve 76.

The mechanism shown in Fig. 3 provides a large flow of water to the engine at the moment following a quick opening of the throttle, at which time, the manifold pressure will be very low. This is due to the fact that when the throttle control rod 15 is moved quickly to the right in Fig. 3, the check valve 74 in the piston 71 will close, thus forcing fluid in the piston to pass through the bypass pipe 75. This restricts the compression of the spring 62, and consequently, moves the valve 31 quickly into open position, thus opening the water valve wide when the suction in the air passage is at its minimum. As the engine accelerates and the suction in the air passage 8 increases, the cylinder 70 moves gradually to the right in Fig. 3 relatively to the piston so that the water valve assumes the position which it would normally occupy if the dashpot were not provided. By means of this arrangement, an ample supply of water to the engine is provided at times when the suction in the air passage 8 is low. The ball check valve 74 in the piston permits the normal operation of the water valve control mechanism when the throttle valve rod 15 is moved in the opposite direction, to close the throttle valve.

The flow of water from the container 20 to the discharge nozzle 26 may be by gravity, or if desired, the water in the container 20 may be under pressure and the nozzle 26 may be of the type which provides for a spray of water producing relatively fine drops or mist. By arranging the discharge nozzle as shown adjacent to the inlet portion of the air passage 8, the water will be vaporized, even if it is not in very finely divided form, by first passing through the carburetor, and then into the intake manifold. By arranging the water discharge nozzle in advance of the carburetor, the air which is free from gasoline vapor will more readily vaporize the water.

While I have described the device as used in connection with the admission of water to the intake of an engine, it will be obvious that other liquids may be supplied to the container 20. For example, in cold weather it is desirable to provide a mixture of water and alcohol so that the liquid will not freeze. The term "water" is herein used to designate such other liquids as well as water.

The apparatus described also has the advantage that if at any time the supply of water in the tank 20 becomes exhausted, no closing of valves or other adjustment of the mechanism is required and the engine will then operate in the same manner as it did before the water supplying means were applied thereto.

I have found that engines supplied with my improved water feed means operate at lower temperatures and the operation of the engine is much smoother and less noisy. I have also found that a remarkable reduction in the carbon deposit on the engine cylinders, pistons and spark plugs results from the use of water in properly regulated quantities in accordance with my invention, and that it inhibits the burning of exhaust valves and exhaust manifold. The addition of water to the intake of the engine also reduces the tendency of the engine to knock and when my water supplying means are applied to an engine, the engine can then operate satisfactorily on fuel of lower octane rating.

I claim as my invention:

1. In an internal combustion engine having a passage for supplying air to the engine and a throttle valve in said passage, that improvement which includes a container for water, a duct leading from said container to said air passage for supplying water thereto, a valve in said duct for controlling the quantity of water supplied to said engine, a lever connected with said valve for opening and closing the same, a resilient member connected at one end with said lever and having the other end actuated by movements of said throttle valve for moving said lever in a direction to open said water valve, a second resilient member mounted to urge said valve into closed position, and a dashpot including a cylinder and a plunger, one of which is connected with one end of said first resilient member and the other of which is connected with the other end of said first resilient member for retarding compression of said first resilient member to provide quick opening of said water valve when said throttle valve is moved quickly toward open position.

2. In an internal combustion engine having a carburetor, a passage for a mixture of air and fuel leading from the carburetor to the engine, a throttle valve in said passage, and a rod connected with said valve for actuating the same, that improvement which includes a container for water, a duct leading from said container to said passage for supplying water to said passage, a valve in said duct for regulating the flow of water through the same, a lever connected with said water valve for opening and closing the same, a link pivotally connected at one end with said lever, a second link connected with said rod, said links being movable relatively to each other and being substantially in alinement, a spring connecting said links and substantially in alinement therewith, one of said links having a portion thereof threaded, a nut on said threaded portion and engaging one end of said spring and adjustable lengthwise of said threaded portion to vary the compression of said spring, a third link which is pivotally connected at one end with said lever, a fixed part on said engine on which said third link is guided, a coil spring extending about said third link and bearing at one end on said fixed part, a part on said third link with which the other end of said coil spring engages and which is adjustable lengthwise of said third link to vary the compression of the spring of said third link, said spring of said third link urging said link to move in a direction for closing said valve in said duct, said first and second links and the spring connecting the same being movable by said rod in a direction to open said valve in said duct during the movement of said rod in a direction to open said throttle valve, after compression of said spring of said first and second links to an extent sufficient to overcome the initial compression of said spring of said third link, and stop means for limiting the movement of said lever.

WILLIAM R. SCHWINDLER.

REFERENCES CITED

The following references are of record in the file of this patent:

UNITED STATES PATENTS

| Number | Name | Date |
| --- | --- | --- |
| 1,338,993 | McNeel | May 4, 1920 |
| 1,575,402 | Woodward | Mar. 2, 1926 |
| 2,036,465 | Dolza | Apr. 7, 1936 |
| 1,734,872 | Nash et al. | Nov. 5, 1929 |